(12) United States Patent
Baek et al.

(10) Patent No.: US 6,639,639 B2
(45) Date of Patent: Oct. 28, 2003

(54) REFLECTIVE AND TRANSFLECTIVE LIQUID CRYSTAL DISPLAY DEVICES HAVING BLACK RESIN

(75) Inventors: Heum-Il Baek, Seoul (KR); Yong-Beom Kim, Gyeonggi-do (KR); Kyoung-Su Ha, Seoul (KR); Dong-Guk Kim, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 24 days.

(21) Appl. No.: 09/933,124

(22) Filed: Aug. 21, 2001

(65) Prior Publication Data

US 2002/0093609 A1 Jul. 18, 2002

(Under 37 CFR 1.47)

(30) Foreign Application Priority Data

Aug. 21, 2000  (KR) ........................................ 2000-48236

(51) Int. Cl.⁷ ............................................. G02F 1/1335
(52) U.S. Cl. ........................ 349/113; 349/122; 349/110
(58) Field of Search ................................. 349/113, 110, 349/106, 122, 138

(56) References Cited

U.S. PATENT DOCUMENTS

| | | | | |
|---|---|---|---|---|
| 6,330,043 B1 | * | 12/2001 | Kikkawa et al. | ............... 349/43 |
| 6,342,935 B1 | * | 1/2002 | Jang et al. | .................. 349/113 |
| 6,373,540 B1 | * | 4/2002 | Munakata | .................... 349/117 |
| 6,476,890 B1 | * | 11/2002 | Funahata et al. | ........... 349/113 |

* cited by examiner

*Primary Examiner*—Kenneth Parker
*Assistant Examiner*—David Chung
(74) *Attorney, Agent, or Firm*—Morgan Lewis & Bockius LLP (57) ABSTRACT

A liquid crystal display device includes first and second substrates facing and spaced apart from each other, a liquid crystal layer interposed between the first and second substrates, a transparent common electrode disposed on the first substrate, a gate line disposed on the second substrate along a first direction, a data line disposed on the second substrate along a second direction perpendicular to the first direction, a thin film transistor disposed at an intersection of the gate line and the data line, a gate insulation layer disposed on the second substrate, a passivation layer disposed on the gate insulation layer, and a reflective electrode disposed on the passivation layer, wherein the reflective electrode overlaps end portions of the data line.

27 Claims, 6 Drawing Sheets

REFLECTIVE AND TRANSFLECTIVE LIQUID CRYSTAL DISPLAY DEVICES HAVING BLACK RESIN

This application claims the benefit of Korean Patent Application No. 2000-48236, filed on Aug. 21, 2000, under 35 U.S.C. §119, the entirety of which is hereby incorporated by reference.

BACKGROUND OF THE INVENTION

1. Field of the Invention

The present invention relates to a liquid crystal display (LCD) device, and more particularly, to reflective and transflective LCD devices having black resin.

2. Description of Related Art

Until now, the cathode-ray tube (CRT) has been developed and mainly used for display systems. However, flat panel displays are beginning to make an appearance because of their small depth dimensions, desirably low weight, and low voltage power supply requirements. Presently, thin film transistor-liquid crystal displays (TFT-LCDs) with high resolution and small depth dimension are being developed.

During operation of the TFT-LCD, a pixel is turned ON by switching elements to transmit light generated from a backlight device. The switching elements are generally amorphous silicon thin film transistors (a-Si:H TFTs) that use an amorphous silicon layer. Advantageously, the amorphous silicon TFTs can be formed on low cost glass substrates using low temperature processing techniques.

Figure 1:
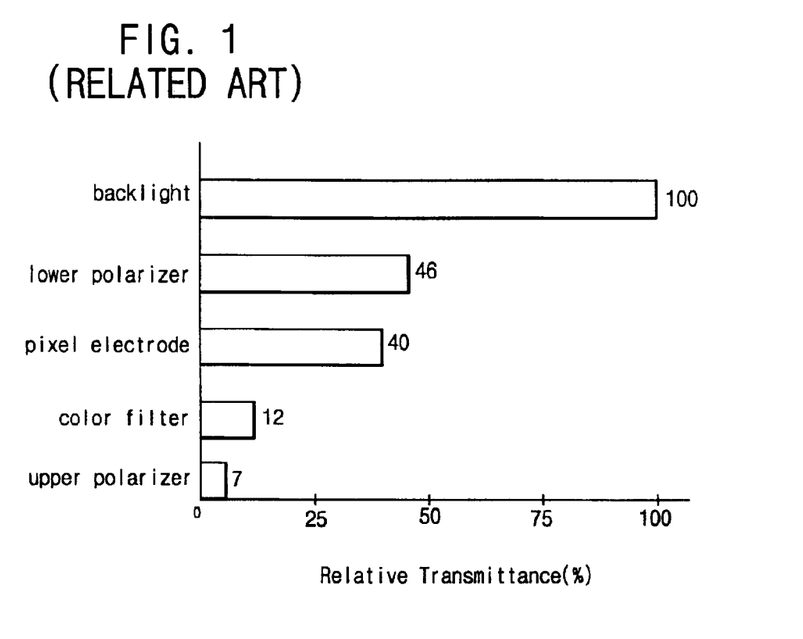
FIG. 1 is a graph illustrating a relative transmittance measured after light passes through each layer of a conventional liquid crystal display (LCD) device.

In general, the TFT-LCD transmits image data using light emitted from the backlight device that is positioned under a TFT-LCD panel. However, the TFT-LCD only employs 3~8% of the incident light generated from the backlight device, thereby providing inefficient optical modulation. In the TFT-LCD device, two polarizers will typically have a transmittance of 45% and two corresponding substrates will typically have a transmittance of 94%. The TFT array and the pixel electrode may have a transmittance of 65% and the color filter may have a transmittance of 27%. Therefore, the typical transmissive TFT-LCD device has a relative transmittance of about 7.4% as shown in FIG. 1. Additionally, FIG. 1 also shows the relative transmittance after light passes through each layer of the device. For this reason, the transmissive TFT-LCD device requires a light source having a relatively high initial brightness. However, such a high initial brightness increases electric power consumption requirements of the backlight device. Accordingly, a relatively heavy battery is needed to supply sufficient power to the backlight device. Moreover, use of the battery source will limit the time in which the TFT-LCD can properly operate.

In order to overcome these problems, a reflective TFT-LCD has been developed. Since the reflective TFT-LCD device uses ambient light as a light source, the device is light and portable. Additionally, the reflective TFT-LCD device has a superior aperture ratio as compared to a transmissive TFT-LCD device. Namely, since the reflective TFT-LCD substitutes an opaque reflective electrode for a transparent electrode material in the pixel of the conventional transmissive TFT-LCD, the opaque reflective electrode reflects ambient light. Accordingly, since the reflective TFT-LCD device uses ambient light rather than an internal light source, battery life of the reflective TFT-LCD can be increased resulting in a longer period of use. In other words, the reflective TFT-LCD device is driven using light reflected from the reflective electrode, thereby only drive circuitry that drives the liquid crystal uses the battery source in the reflective TFT-LCD device.

Figure 2:
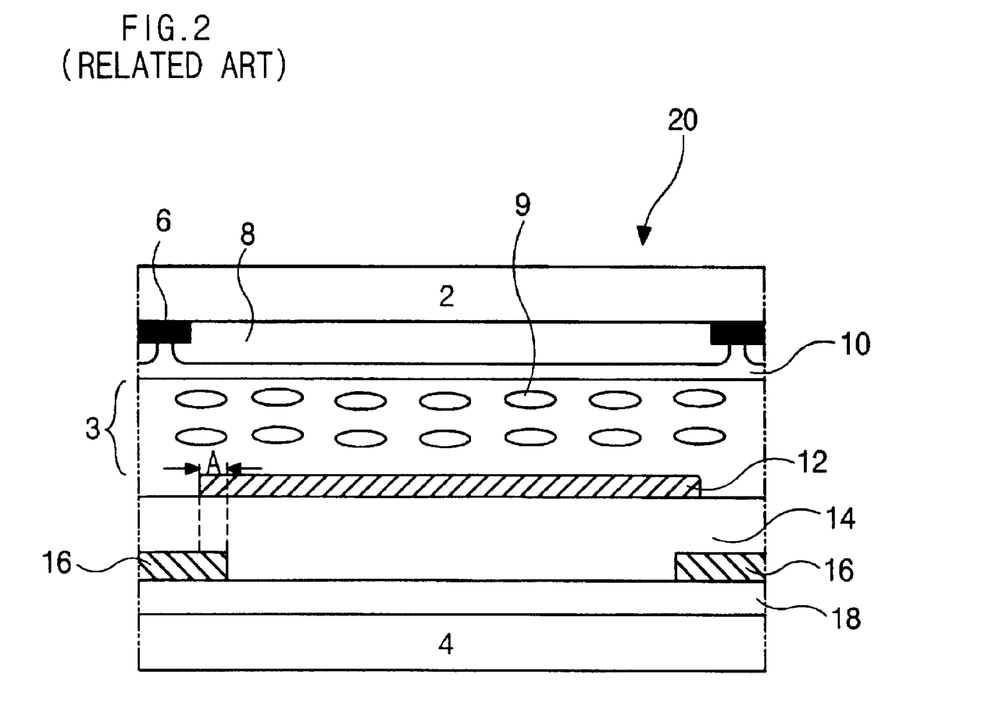
FIG. 2 is a schematic cross-sectional view of a conventional reflective liquid crystal display device.

FIG. 2 is a schematic cross-sectional view of a conventional reflective liquid crystal display device. In FIG. 2, the reflective LCD device 20 comprises an upper substrate 2, a lower substrate 4, and a liquid crystal layer 3 interposed therebetween. On a first surface of the upper substrate 2 that opposes the lower substrate 4, a black matrix 6 isolates color filters 8 (Red, Green and Blue) that are disposed on the first surface of the upper substrate 2. The color filters 8 and the black matrix 6 are disposed on a similar plane, and a transparent common electrode 10 is disposed on the color filters 8 and black matrix 6.

A gate insulation layer 18 is disposed on a first surface of the lower substrate 4 that opposes the first surface of the upper substrate 2. A passivation layer 14 is disposed on the gate insulation layer 18, and data lines 16 that transmit data signals to the TFT (not shown) are disposed between the gate insulation layer 18 and the passivation layer 14 and on both sides of a pixel region. A reflective electrode 12 is disposed on the passivation layer 14 and, in combination with the transparent electrode 10, controls orientation of liquid crystal molecules 9 by application of an electric field. The reflective electrode 12 reflects ambient light to display image data and functions as a pixel electrode. Furthermore, since the reflective LCD device 20 displays image data using the ambient light, lateral side edges of the reflective electrode 12 overlap portions of the data lines 16, thereby increasing aperture ratio. The reflective electrode 12 is formed of an opaque metallic material that has superior light reflectance, while the passivation layer 14 is formed of an insulating material that has a low dielectric constant of about 3 ($\epsilon \approx 3$), such as benzocyclobutene (BCB) or acryl-based resin, for example. Accordingly, since the passivation layer is disposed between the reflective electrode 12 and the data lines 16, electrical interference, i.e., cross talk, is prevented. Here, a thickness of the passivation layer 14 is about 1.5 micrometers ($\mu$m).

In FIG. 2, an overlap area "A" represents an area of the pixel electrode 12 that overlaps the data line 16. Since the data line 16 is shielded from incident light by this overlap area "A" of the pixel electrode 12, a substantial portion of the black matrix 6 corresponding to the overlap area "A" can be removed. However, if the portion of the black matrix 6 corresponding to the overlap area "A" is removed, a width of the black matrix 6 is narrowed, thereby creating misalignment problems during manufacturing processes. For example, the misalignment of the red, green and blue color filters 8 is created due to a small aligning margin of the black matrix 6, and the misalignment of the upper and lower substrates is created when attaching the upper substrate 2 to the lower substrate 4. The width of the overlap area "A" is about 2 $\mu$m, and a width of the black matrix is ideally about 4 $\mu$m. However, in practice the ideal width of the black matrix is difficult to obtain because of the above-mentioned problems. Accordingly, a width of more than 4 $\mu$m needs to be maintained for the black matrix so that the overlap area "A" is covered by the black matrix. Thus, increasing the aperture ratio is difficult.

Meanwhile, the reflective TFT-LCD device can be adversely affected by its surroundings. For example, the brightness of indoor ambient light differs greatly from the brightness of outdoor ambient light. In addition, the brightness of the outdoor ambient light is dependent upon the time of day (i.e., noon or dusk) such that the reflective TFT-LCD device cannot be used at night without sufficient ambient light. Accordingly, there is a need for a transflective TFT- LCD device that can be used during daylight hours, as well as nighttime, since the transflective LCD device can be changed to either a transmissive mode or a reflective mode depending on the desired condition of operation.

Figure 3:
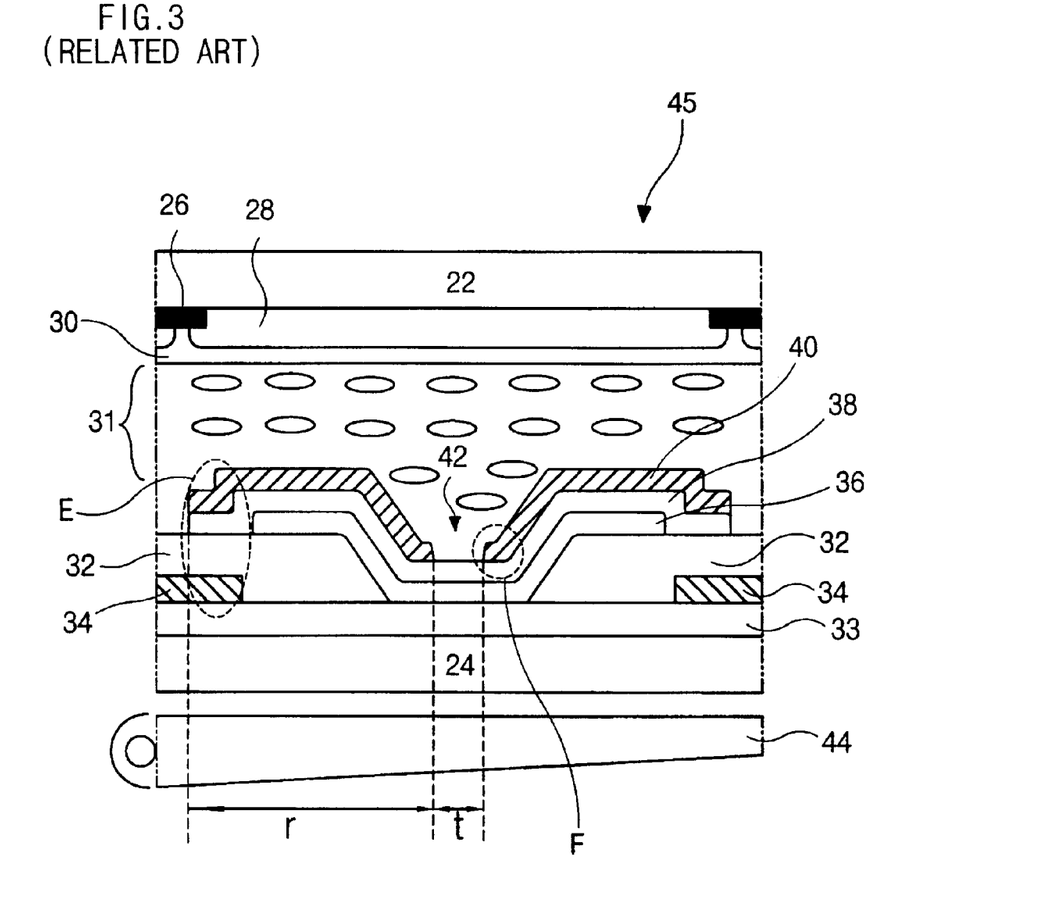
FIG. 3 is a schematic cross-sectional view of a pixel area of a conventional transflective liquid crystal display device.

FIG. 3 is a schematic cross-sectional view of a pixel area of a conventional transflective liquid crystal display device. In FIG. 3, the transflective TFT-LCD device includes a liquid crystal panel 45 and a backlight device 44. The liquid crystal display panel 45 includes an upper substrate 22, a lower substrate 24 and a liquid crystal layer 31 interposed therebetween. The upper substrate 22 and the lower substrate 24 are commonly referred to as a color filter substrate and an array substrate, respectively. The upper substrate 22 includes a black matrix 26 and color filters 28 on a surface of the upper substrate 22 that faces the lower substrate 24, and a transparent common electrode 30 is formed on the color filters 28 and black matrix 26. Here, the black matrix 26 and color filters 28 are located in a common plane.

In FIG. 3, the lower substrate 24 has a gate insulation layer 33 disposed on a surface that faces the upper substrate 22 and data lines 34 are formed on the gate insulation layer 33. A passivation layer 32 is formed on the gate insulation layer 33 while covering the data lines 34 and has a trapezoidal-shaped transmitting hole 42. Thus, the passivation layer 32 has inclined portions disposed adjacent to the transmitting hole 42. A transparent electrode 36 is formed on the passivation layer 32 and is disposed within the transmitting hole 42, and an interlayer insulator 38 and a reflective electrode 40 are formed in series on the transparent electrode 36. The interlayer insulator 38 electrically insulates the reflective electrode 40 from the transparent electrode 36.

In the transflective liquid crystal display device described above, the reflective electrode 40 and the transparent electrode 36 function together as a pixel electrode. Furthermore, the lower substrate 24 is divided into a reflective portion "r" and a transmitting portion "t" such that the passivation layer 32 is formed to create different cell gaps between the reflective portion "r" and the transmitting portion "t." Namely, a first cell gap is defined by an interval, i.e., the reflective portion, between the reflective electrode 40 and the transparent common electrode 30, and a second cell gap is defined by an interval, i.e., the transparent portion, between the transparent electrode 36 and the transparent common electrode 30. As shown in FIG. 3, the passivation layer 32 of the array substrate 24 is formed to create a step difference between the first cell gap and the second cell gap. Thus, the thickness of the liquid crystal layer 31 is different within each of the first and second cell gaps. Preferably, the second cell gap is twice as long as the first cell gap.

As previously described, the reflective electrode 40 in the reflective portion "r" reflects the ambient light, while the transparent electrode 36 in the transmitting portion "t" transmits the light emitted from the backlight device 44. In this structure, the reflective electrode 40 overlaps a portion of the data line 34, thereby forming an overlap area "E." The overlap area "E" extends the pixel region and the aperture ratio similar to the reflective LCD device shown in FIG. 2. However, it is difficult to obtain a desired aperture ratio because a width of the black matrix 26 is required to be about 4 μm. Moreover, as previously described, if a portion of the black matrix 26 corresponding to the overlap area "E" is removed, the width of the black matrix 26 is narrowed, thereby creating misalignment problems during manufacturing processes. For example, the misalignment of the red, green and blue color filters 28 occurs due to a small alignment margin of the black matrix 26, and the misalignment of the upper and lower substrates occurs when attaching the upper substrate 22 to the lower substrate 24.

Furthermore, in the transflective LCD device shown in FIG. 3, portions of the reflective electrode 40 are positioned on the inclined portions of the interlayer insulator 38 to prevent light leakage. In addition, extended portions "F" of the reflective electrode 40 are disposed along a peripheral planar portion of the interlayer insulator 38 disposed within the transmitting hole 42. The extended portions "F" decrease a margin of the light leakage error. Therefore, the aperture ratio decreases because the extended portions "F" of the reflective electrode 40 cover a peripheral portion of the transmitting hole 42 in a transmissive mode of the transflective LCD device.

SUMMARY OF THE INVENTION

Accordingly, the present invention is directed to reflective and transflective liquid crystal display devices having black resin that substantially obviates one or more of the problems due to limitations and disadvantages of the related art.

An object of the present invention is to provide reflective and transflective liquid crystal display devices with increased aperture ratios.

Another object of the present invention is to provide reflective and transflective liquid crystal display devices with improved manufacturing processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes first and second substrates facing and spaced apart from each other, a liquid crystal layer interposed between the first and second substrates, a transparent common electrode disposed on the first substrate, a gate line disposed on the second substrate along a first direction, a data line disposed on the second substrate along a second direction perpendicular to the first direction, a thin film transistor disposed at an intersection of the gate line and the data line, a gate insulation layer disposed on the second substrate, a black resin layer disposed on the gate insulation layer, and a reflective electrode disposed on the passivation layer, wherein the reflective electrode overlaps end portions of the data line.

In another aspect, the liquid crystal display device includes first and second substrates facing and spaced apart from each other, a liquid crystal layer interposed between the first and second substrates, a backlight device disposed adjacent to the second substrate for generating light, a transparent common electrode disposed on the first substrate, a gate line disposed on the second substrate along a first direction, a data line disposed on the second substrate along a second direction perpendicular to the first direction, a thin film transistor disposed at a crossing of the gate line and the data line, a gate insulation layer disposed on the second substrate, a passivation layer disposed on the gate insulation layer, the passivation layer having a transmitting hole extending to the gate insulation layer, and the passivation layer made of a black resin, a transparent electrode having a first portion disposed on the passivation layer and a second portion disposed within the transmitting hole, and a reflective electrode formed on the passivation layer, wherein the reflective electrode overlaps end portions of the data line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or the like parts.

Figure 4:
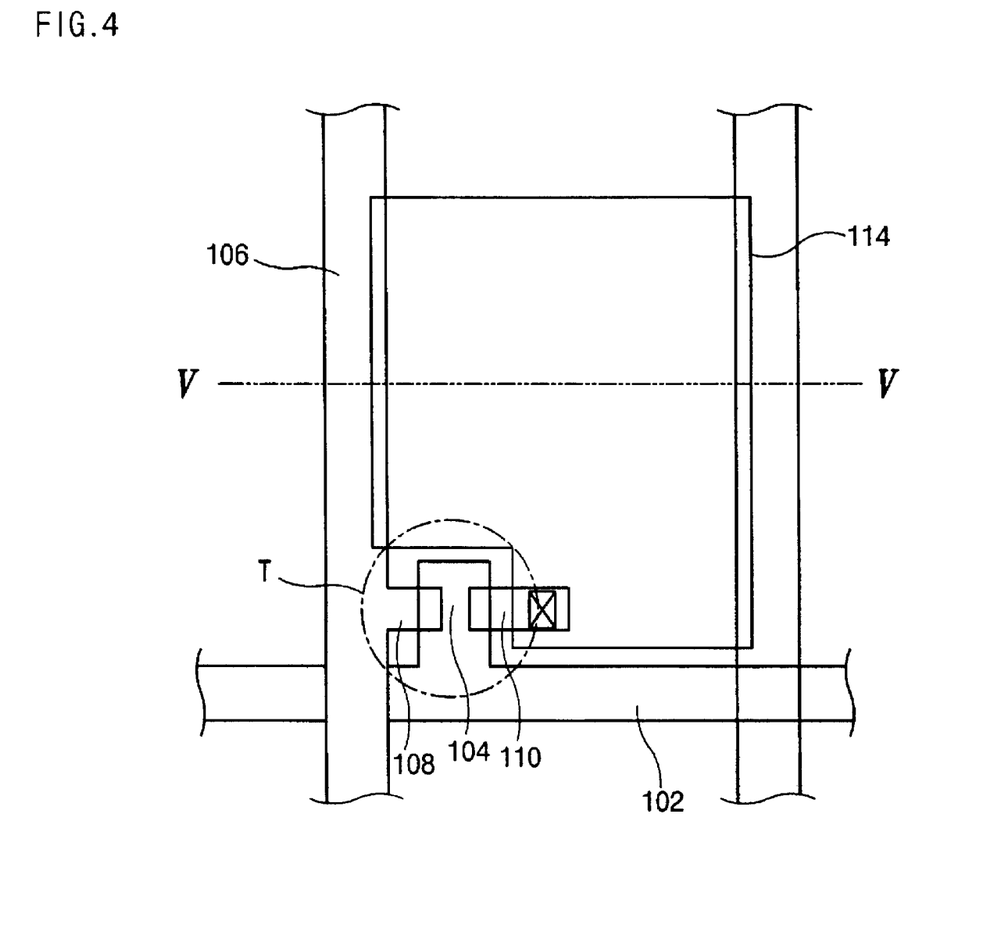
FIG. 4 is a schematic plan view of one pixel of an exemplary reflective liquid crystal display device according to the present invention.

FIG. 4 is a schematic plan view of one pixel of an exemplary reflective liquid crystal display device according to the present invention. In FIG. 4, a gate line 102 is arranged in a transverse direction, while a data line 106 is arrzanged in a longitudinal direction. At a crossover point of the gate line 102 and the data line 106, a thin film transistor (TFT) "T" is disposed. The TFT "T" may include a gate electrode 104, a source electrode 108 and a drain electrode 110. The gate electrode 104 may extend from the gate line 102, and the source electrode 108 may extend from the data line 106 and overlap a portion of the gate electrode 104. The drain electrode 110 is spaced apart from the source electrode 108 and overlaps another portion of the gate electrode 104. A reflective electrode 114 may be formed in a pixel region defined by a pair of gate lines 102 and data lines 106. A portion of the reflective electrode 114 overlaps a portion of the drain electrode 110 and is electrically connected to the drain electrode 110. Lateral side portions of the reflective electrode 114 may overlap corresponding portions of the data lines 106 in an overlap area "B" (see FIG. 5, for example), thereby increasing a pixel area and an aperture ratio. The reflective electrode 114 may include metallic materials, such as aluminum (Al) or Al-alloy, having superior reflectivity.

Figure 5:
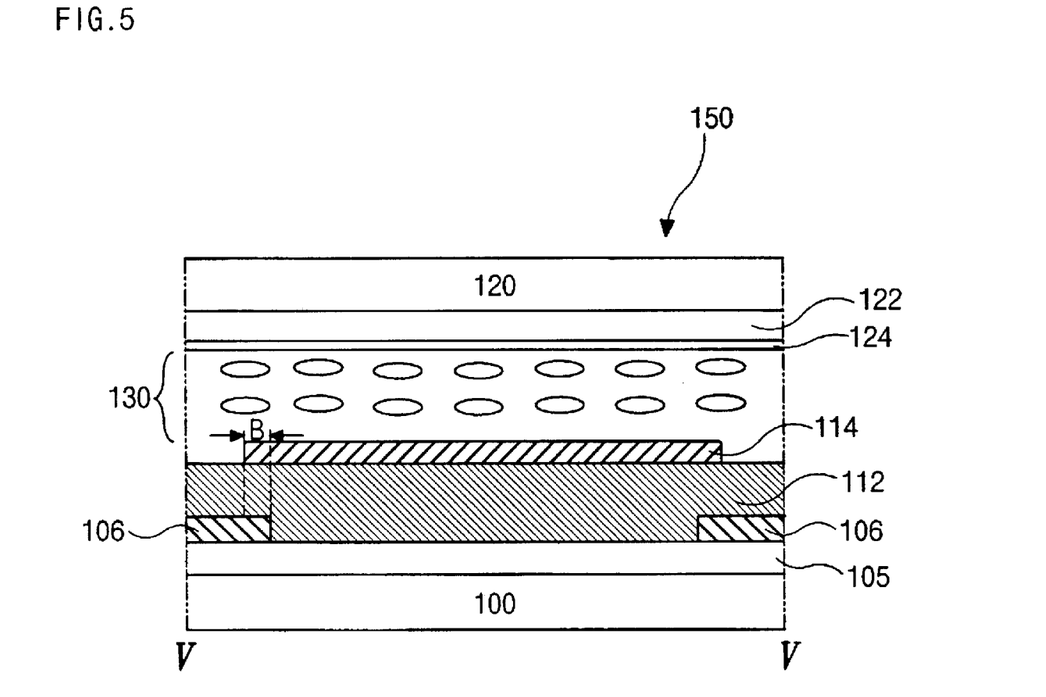
FIG. 5 is a schematic cross-sectional view taken along line V—V of FIG. 4.

FIG. 5 is a schematic cross-sectional view taken along line V—V of FIG. 4. In FIG. 5, the inventive liquid crystal display device 150 includes an upper substrate 120, a lower substrate 100 and a liquid crystal layer 130 disposed therebetween. In contrast to the conventional reflective liquid crystal display device shown in FIG. 2, a first surface of the upper substrate 120 that opposes a first surface of the lower substrate 100 includes a color filter layer 122 without a black matrix. A transparent common electrode 124 is formed on the color filter layer 122 and may include a transparent material such as indium tin oxide and indium zinc oxide, for example.

In FIG. 5, a gate insulation layer 105 is disposed on the first surface of the lower substrate 100 and a passivation layer 112 is disposed on the gate insulation layer 105. Furthermore, data lines 106 that transmit data signals to the TFT (in FIG. 4) are disposed between the gate insulation layer 105 and the passivation layer 112 and are also disposed on opposing sides of a pixel region. A reflective electrode 114 is disposed on the passivation layer 112 and together with the transparent common electrode 124 controls liquid crystal molecules of the liquid crystal layer 130 by application of an electric field, thereby reflecting ambient light to display image data.

In the exemplary reflective LCD device of FIG. 5, the reflective electrode 114 may also function as a pixel electrode with lateral side portions of the reflective electrode 114 overlapping corresponding portions of the data lines 106 at overlap areas "B," thereby increasing an aperture ratio. Thus, overlap areas "B" may be created at opposing lateral side portions of the reflective electrode 114. The passivation layer 112 may be made of black resin to function not only as an insulator but also as a light shielding layer. Accordingly, the passivation layer 112 prevents the transparent common electrode 124 from being exposed to incident light in an outside area of the reflective electrode 114 in the pixel region. In contrast to the conventional art, since the passivation layer 112 is formed of the black resin, a black matrix is not required on a surface of the upper substrate 120, thereby simplifying the manufacturing processes.

Furthermore, the overlap area "B" represents an area of the pixel electrode 114 that overlaps the data line 106. Compared to the conventional reflective LCD device, since the black matrix is not formed on the upper substrate 120, a margin of the overlap area "B" between the reflective electrode 114 and the date line 106 can be maximized, thereby achieving a high aperture ratio.

Figure 6:
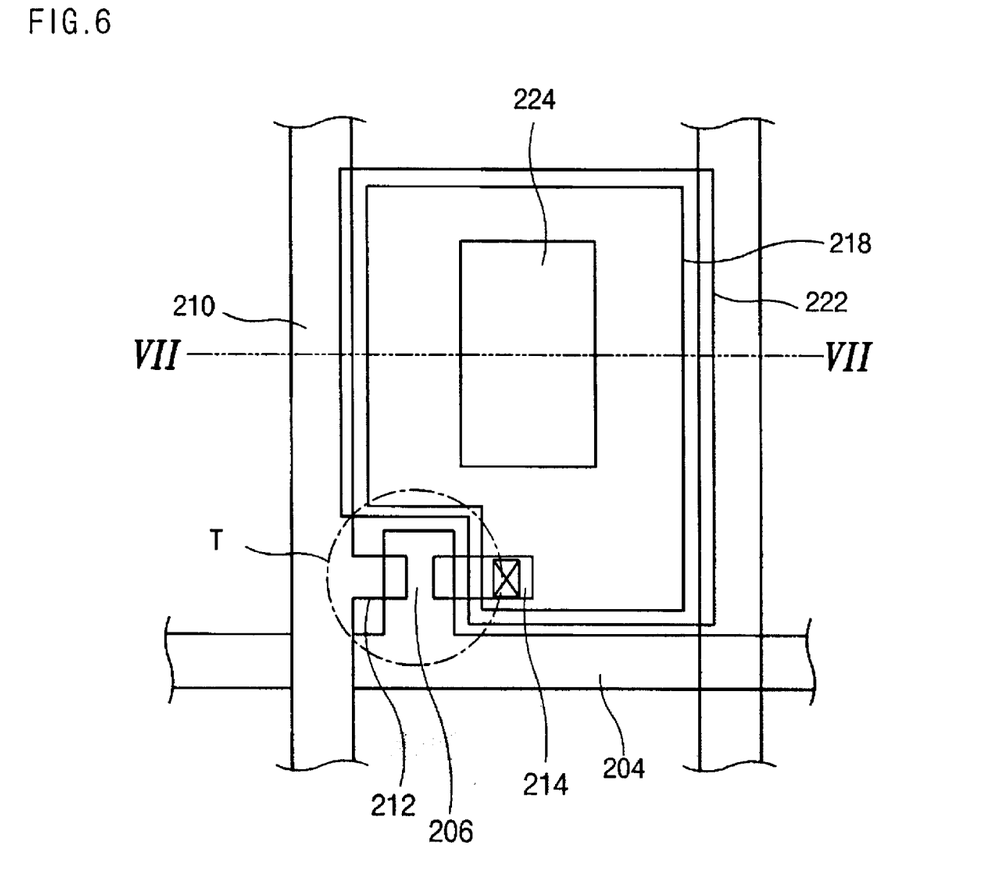
FIG. 6 is a schematic plan view of one pixel of another exemplary transflective liquid crystal display device according to the present invention.

FIG. 6 is a schematic plan view of one pixel of another exemplary transflective liquid crystal display device according to the present invention. In FIG. 6, a gate line 204 is arranged in a transverse direction, while a data line 210 is arranged in a longitudinal direction. At a crossover point of the gate line 204 and the data line 210, a thin film transistor (TFT) "T" is disposed. The TFT "T" may include a gate electrode 206, a source electrode 212 and a drain electrode 214. The gate electrode 206 may extend from the gate line 204, and the source electrode 212 may extend from the data line 210 and overlap a portion of the gate electrode 206. The drain electrode 214 is spaced apart from the source electrode 212 and overlaps another portion of the gate electrode 206.

In FIG. 6, a transparent electrode 218 and a reflective electrode 222, which together function as a pixel electrode, are formed in a pixel region defined by a pair of gate lines 204 and data lines 210. The transparent electrode 218 is electrically connected with the drain electrode 214 through a drain contact hole. Lateral side portions of the reflective electrode 222 may overlap corresponding portions of the data lines 210 in an overlap area "C" (see FIG. 7) formed at both lateral side portions of the reflective electrode 222, thereby increasing a pixel area and an aperture ratio. The transparent electrode 218 may include transparent materials such as indium tin oxide and indium zinc oxide, for example. The reflective electrode 222 may include metallic materials, such as aluminum (Al) or Al-alloy, having superior reflectivity. The reflective electrode 222 may include a transmitting hole (224 also shown in FIG. 7) disposed in a central portion of the reflective electrode 222. Accordingly, the reflective electrode 222 reflects ambient light to display image data in the reflective mode, and the transmitting hole 224 transmits artificial light generated from a backlight device (see reference element 240 of FIG. 7) to display image data in a transmissive mode.

Figure 7:
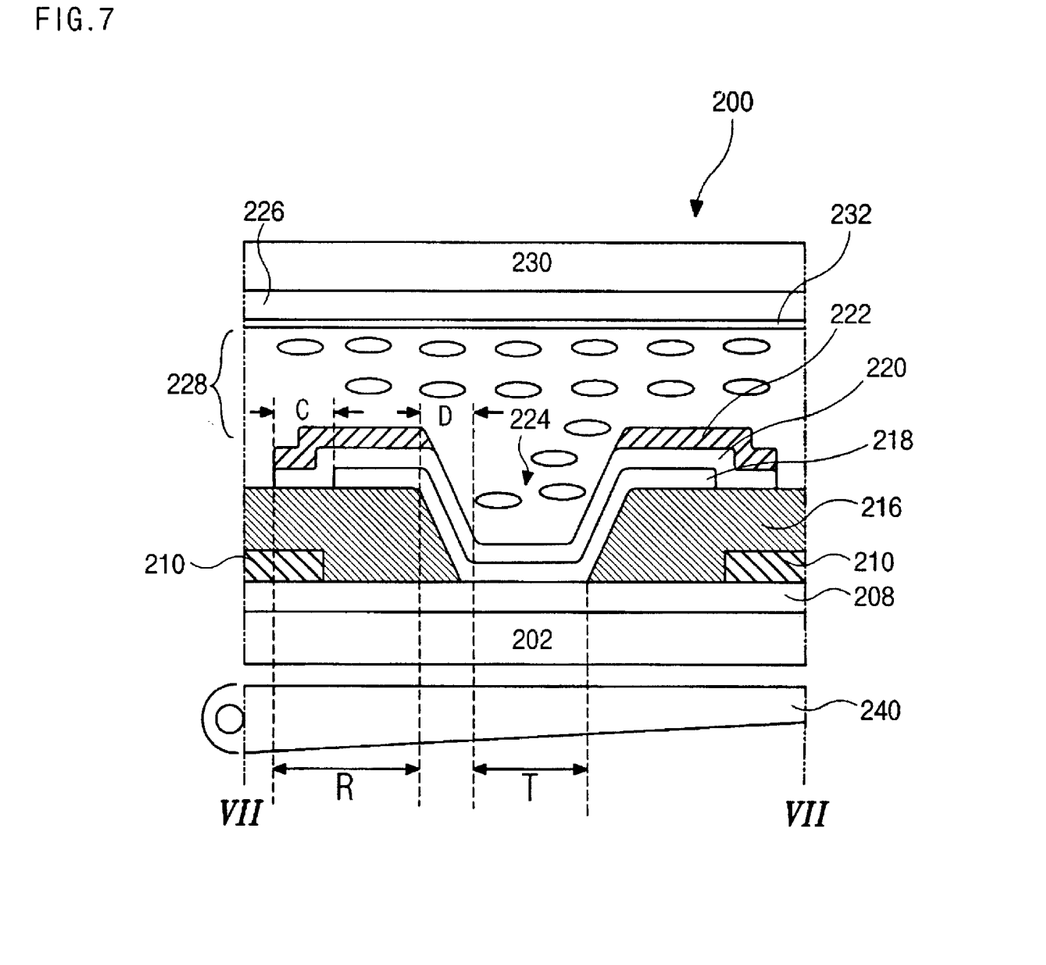
FIG. 7 is a schematic cross-sectional view taken along line VII—VII of FIG. 6.

FIG. 7 is a schematic cross-sectional view taken along line VII—VII of FIG. 6. In FIG. 7, the transflective TFT-LCD device may include a liquid crystal panel 200 and a backlight device 240. The liquid crystal display panel 200 includes an upper substrate 230, a lower substrate 202 and a liquid crystal layer 228 disposed therebetween. The upper substrate 230 and the lower substrate 202 are referred to as a color filter substrate and an array substrate, respectively. The upper substrate 230 may include a color filter layer 226 disposed on a first surface that faces the lower substrate 202 and a transparent common electrode 232 may be disposed on the color filter layer 226. The transparent common electrode 232 may include a transparent material such as indium tin oxide and indium zinc oxide, for example.

Furthermore, the lower substrate 202 may include a gate insulation layer 208 disposed on a first surface of the lower substrate that faces the upper substrate 230. Data lines 210 may be formed on the gate insulation layer 208, and a passivation layer 216 may be formed on the gate insulation layer 208 to cover the data lines 210. The passivation layer 216 may include a transmitting hole 224. The transmitting hole 224 may include a polygonal shape such as a trapezoid, for example. Accordingly, the passivation layer 216 may have inclined portions disposed laterally about the transmitting hole 224. A transparent electrode 218 may be disposed on the passivation layer 216 and include portions disposed within the transmitting hole 224. The transparent electrode 218 may include a transparent material including indium tin oxide and indium zinc oxide, for example. Further, an interlayer insulator 220 may be disposed on the transparent electrode 218 and may have portions disposed on the passivation layer 216 so as to laterally surround end portions of the transparent electrode 218. A reflective electrode 222 that may include a transmitting hole 224 may be disposed on the interlayer insulator 220. The interlayer insulator 220 electrically insulates the reflective electrode 222 from the transparent electrode 218.

Although FIG. 7 specifically shows the reflective electrode 222 disposed above the transparent electrode 218, the transparent electrode 218 can be disposed over the reflective electrode 222. In other words, the transparent electrode 218 may be interchanged with the reflective electrode 222. In this instance, the interlayer insulator 220 may be formed between the reflective electrode 222 and the transparent electrode 218.

In the present exemplary transflective liquid crystal display device described above, the reflective electrode 222 and transparent electrode 218 together may function as a pixel electrode. Further, the lower substrate 202 may be divided into a reflective portion "R" and a transmitting portion "T." As previously described, the passivation layer 216 may be disposed to create different cell gaps between the reflective portion "R" and the transmitting portion "T." The passivation layer 216 may be made of black resin to function not only as an insulator but also as a light shielding layer. Accordingly, the black resin is not required on the upper substrate 230, thereby simplifying manufacturing processes of the transflective liquid crystal display device.

As previously described with respect to FIG. 7, the reflective electrode 222 in the reflective portion "R" reflects the ambient light, while the transparent electrode 218 in the transmitting portion "T" transmits the light emitted from the backlight device 240. In this structure, the reflective electrode 222 overlaps a lateral end portion of the data line 210, thereby creating an overlap area "C." The overlap area "C" extends a pixel region and an aperture ratio similar to the reflective LCD device shown in FIG. 5. Compared to the conventional transflective LCD device, since the black resin is not formed on the upper substrate 230, a width of the overlapped area "C" can be maximized, thereby obtaining a high aperture ratio in the reflective mode of the transflective liquid crystal display device.

Furthermore, since the black resin is employed as the passivation layer 216, light leakage does not occur within an inclined area "D." Therefore, as compared to the conventional device shown in FIG. 3, a portion of the reflective electrode 222 is not required to extend onto the interlayer insulator 220 within the transmitting hole 224 of the transmitting portion "T" to prevent light leakage. Accordingly, the aperture ratio increases in the transmissive mode of the exemplary transflective liquid crystal display device of the present invention.

It will be apparent to those skilled in the art that various modifications and variations can be made in the reflective and transmissive liquid crystal display devices having black resin of the present invention without departing from the spirit or scope of the invention. Thus, it is intended that the present invention covers the modifications and variations of this invention provided they come within the scope of the appended claims and their equivalents.

What is claimed is:

1. A liquid crystal display device, comprising:
    first and second substrates facing and spaced apart from each other;
    a liquid crystal layer interposed between the first and second substrates;
    a transparent common electrode disposed on the first substrate;
    a gate line disposed on the second substrate along a first direction;
    a data line disposed on the second substrate along a second direction perpendicular to the first direction;
    a thin film transistor disposed at an intersection of the gate line and the data line;
    a gate insulation layer disposed on the second substrate;
    a black resin layer disposed directly on at least the gate insulation layer; and
    a reflective electrode disposed on the passivation layer,
    wherein the reflective electrode overlaps end portions of the data line, and the reflective electrode functions as a pixel electrode.

2. The liquid crystal display device according to claim 1, wherein the reflective electrode is formed in a pixel region defined by the gate line and the data line.

3. The liquid crystal display device according to claim 1, further comprising a color filter layer disposed between the transparent common electrode and the first substrate.

4. The liquid crystal display device according to claim 1, wherein the data line is disposed between the gate insulation layer and the passivation layer.

5. The liquid crystal display device according to claim 1, wherein the thin film transistor includes a gate electrode, a source electrode and a drain electrode.

6. The liquid crystal display device according to claim 5, wherein the drain electrode is electrically connected to the reflective electrode.

7. The liquid crystal display device according to claim 1, wherein the reflective electrode includes a metallic material.

8. The liquid crystal display device according to claim 7, wherein the metallic material includes at least aluminum.

9. The liquid crystal display device according to claim 7, wherein the metallic material includes an aluminum alloy.

10. A liquid crystal display device, comprising:

first and second substrates facing and spaced apart from each other;

a liquid crystal layer interposed between the first and second substrates;

a backlight device disposed adjacent to the second substrate for generating light;

a transparent common electrode disposed on the first substrate;

a gate line disposed on the second substrate along a first direction;

a data line disposed on the second substrate along a second direction perpendicular to the first direction;

a thin film transistor disposed at a crossing of the gate line and the data line;

a gate insulation layer disposed on the second substrate;

a passivation layer disposed on the gate insulation layer, the passivation layer having a transmitting hole extending to the gate insulation layer, and the passivation layer made of a black resin;

a transparent electrode having a first portion disposed on the passivation layer and a second portion disposed within the transmitting hole; and a reflective electrode formed on the passivation layer, wherein the reflective electrode overlaps end portions of the data line.

11. The liquid crystal display device according to claim 10, wherein the reflective electrode is disposed in a pixel region defined by the gate line and the data line.

12. The liquid crystal display device according to claim 10, wherein the transparent electrode is disposed above the reflective electrode.

13. The liquid crystal display device according to claim 12, further comprising an interlayer insulator disposed between the reflective electrode and the transparent electrode.

14. The liquid crystal display device according to claim 10, wherein the reflective electrode is disposed above the transparent electrode.

15. The liquid crystal display device according to claim 14, further comprising an interlayer insulator disposed between the transparent electrode and the reflective electrode.

16. The liquid crystal display device according to claim 10, wherein the data line is disposed between the gate insulation layer and the passivation layer.

17. The liquid crystal display device according to claim 10, wherein the thin film transistor includes a gate electrode, a source electrode and a drain electrode.

18. The liquid crystal display device according to claim 17, wherein the drain electrode is electrically connected to the transparent electrode.

19. The liquid crystal display device according to claim 10, wherein the reflective electrode includes a metallic material.

20. The liquid crystal display device according to claim 19, wherein the metallic material includes at least aluminum.

21. The liquid crystal display device according to claim 20, wherein the metallic material includes an aluminum alloy.

22. The liquid crystal display device according to claim 10, wherein the transmitting hole has a trapezoidal shape.

23. The liquid crystal display device according to claim 10, wherein the passivation layer has inclinded portions disposed about the transmitting hole.

24. The liquid crystal display device according to claim 10, wherein the transparent common electrode and the transparent electrode include a transparent material selected from a group consisting of indium tin oxide and indium zinc oxide.

25. The liquid crystal display device according to claim 10, wherein the second substrate is divided into a reflective portion and a transmitting portion.

26. The liquid crystal display device according to claim 25, the reflective electrode is disposed in the reflective portion and the transmitting hole is disposed in the transmitting portion.

27. A liquid crystal display device, comprising:

first and second substrates;

a gate insulation layer disposed on the second substrate;

a black resin layer disposed on the gate insulation layer and having a transmitting hole exposing the gate insulation layer;

a transparent electrode disposed on the black resin layer and within the transmitting hole; and a reflective electrode formed on the black resin layer.

* * * * *